United States Patent Office 3,692,548
Patented Sept. 19, 1972

3,692,548
UNIVERSAL AQUEOUS INK CONTAINING
2-BUTYNE-1,4 DIOL
Marvin Packer, Broomall, Pa., assignor to
Honeywell, Inc., Minneapolis, Minn.
No Drawing. Filed Apr. 1, 1971, Ser. No. 130,466
Int. Cl. C09d 11/00
U.S. Cl. 106—22        12 Claims

ABSTRACT OF THE DISCLOSURE

A single unique universal ink mixture containing polyethylene oxide polymer and other ingredients which can be used in place of the numerous different types of tailor made slow drying, quick drying and general purpose-medium drying inks that have heretofore been required to make different types of records. This multi-purpose ink is also useful in inscribing a clear continuous line on a marking surface e.g. a chart during adverse writing conditions such as when it is required to be transmitted through a long length of capillary tubing to a pen and when it is to be used in an abnormally humid or below freezing climate.

---

It is an object of the present invention to provide a unique ink that contains polyethylene oxide as one of its ingredients and which differs from other commercially available inks which contains polyethylene oxide in that it can be beneficially employed while operating under a below freezing ambient temperature condition in an ink applying means to continuously trace a clear solid line or other mark on a writing surface, such as a chart.

It is another object of the present invention to provide a unique ink of the aforementioned type having certain select ingredients therein that negates the oxidizing effect that dyes have heretofore had on inks that contain polyethylene oxide and thereby enable more of the beneficial effects of the polyethylene oxide to be utilized under adverse inking conditions.

It is for the aforementioned reason another object of the invention to disclose an ink that will be maintained in a more fluid, non-oxidizing state than has heretofore been possible with commercially available inks which contain polyethylene oxide.

More specifically, it is another object of the invention to provide an ink of the aforementioned type that will retain its good inking characteristic over an abnormally long period of time by providing a unique combination of ingredients therein that cannot chemically react with one another to deteriorate and destroy its vital inking characteristics under adverse inking conditions.

More specifically, it is another object of the invention to provide a universal recorder ink for different types of ink to more accurately meet the writing requirements of recording instruments. In other words an ink which can be used in place of each one of a variety of inks of different compositions that are presently tailor-made for quick drying ink operations, slow drying ink operations and inks that are commonly referred to as general purpose or medium drying inks.

An example of a water based ink using glycerin alone or in combination with other alcohols, with and without thickeners, such as polyethylene oxide polymer, is shown in the William A. Forsyth Pat. 3,477,862. The concentration of the thickener employed in the previously mentioned patent provides sufficient stringiness to promote good inking at fast chart and pen speeds. However, the ink disclosed in the Forsyth patent is not useable in ink for all types of ink recording applications such as: (a) where the ink is required to be employed where the ambient temperature is below freezing, or (b) where a long length of capillary is employed to carry the ink from an ink supply to a pen such as is shown in the J. Behmoras et al. Pat. 3,299,436.

Experimentation has shown that universal ink must not exceed a viscosity of about 45 seconds [Ostwald tube] at any temperature. In this regard it should be noted that polyethylene oxide inks have a much higher viscosity than 45 seconds at ambient room temperatures. Furthermore, even though polyethylene oxide inks possess the minimum concentration required to provide stringiness an adverse increase in its viscosity occurs at low temperatures.

Present day commercially available polyethylene oxide ink needs glycerin and other alcohols in their ink formulation for several reasons:

(a) To reduce the freezing point of aqueous solutions to 32° F.

(b) To prevent complete loss of ink by evaporization, and (c) To maintain high surface tension of aqueous mixes to minimize fethering and blotting taking place between the pen and its associated chart and to prevent hard cake drying on the pen tip.

PROBLEMS

As the concentration of glycerin in presently available polyethylene oxide ink is increased it results in (a) an adverse decrease in the drying rate of the ink, and (b) an adverse increase in the viscosity of the ink at low temperature.

SOLUTION

A solution to the aforementioned problem is to provide an ink formulation based upon the dye, water glycerin and/or other polyhydric alcohol, preservative, and an agent which imparts pituitousness or stringiness.

Experimentation has shown that this ink should be capable of providing a clear continuous record, on for example a chart while the operating temperature under which the ink is being used is anywhere between 20° F. and 145° F. In order to achieve a maximum viscosity of not more than 45 seconds at 25° F. an additional material must be included in the formulation specifically for this purpose. This material must be compatible with all of the ingredients and must not cause adverse aging.

Experimentation has shown that certain salts such as potassium iodide and potassium carbonate when added to the ink enables the ink to meet all of the aforementioned requirements.

Experimentation has also shown that a further requirement is that the dye employed in the ink should be compatible with the polyethylene oxide contained therein because many dyes that have heretofore been used have adversely interacted with their polyethylene oxide to cause the latter to lose its stringiness characteristics upon aging.

PROBLEM

This last mentioned problem has been encountered in the use of polyethylene oxide inks that have heretofore been commercially available and this has restricted the use of these inks to a limited number of inking systems.

SOLUTION

Experimentation has also shown that in addition to the selection of a compatible dye an unsaturated alcohol, for example butyne diol, is useful in stabilizing the stringiness of the polyethylene oxide against aging degradation.

A unique suitable aqueous ink mixture that will provide all the aforementioned desired characteristics for an ink containing polyethylene oxide are as follows:

.5% to 3% by weight of a water soluble dye depending on the color intensity that is desired. 1 to 2% by weight alphazurine F.G.N.D. concentrate 200% [blue]

or 1 to 2% by weight of wool Violet 4 BNP concentrate 126% [purple] are two examples of Allied Chemical trade named dyes that meet the aforementioned desired characteristics;

8% by weight of glycerin and 8% by weight ethylene glycol;

.03% to .10% by weight of sodium triphenolate in which the preferred percent by weight of sodium triphenolate is .05%.

Experimentation has shown that this sodium triphenolate should be added to the ink when the ink is to be used in tropical moist atmospheres in order to prevent fungi growth in the ink.

.03 to 0.1% by weight of a high molecular weight polyethyleneoxide polymer [polyox WRS301] in which the preferred percent by weight is .04%.

The preferred polyethylene oxide which is used in the aforementioned ink mixtures is of a high molecular weight on the order of 4,000,000 and preferably is one which is commercially known as WSR301, manufactured by Union Carbide.

It should be understood that the polyethylene oxide used in the oforementioned ink mixtures can also be of a low molecular weight, on the order of 600,000, such as the polyethylene oxide known commercially as WSR205 also manufactured by Union Carbide. It should be further understood, however, that, whereas from .03 to .10% by weight of the heavier oxide provides a desirable mixture, from 5 to 10 percent by weight of the lower molecular weight type of polyethylene oxide should be used in the ink mixture to obtain as equivalent good clear continuous line recording results as those that are obtained with the high molecular polyethylene oxide.

2½% to 8% by weight of potassium iodide in which the preferred percent by weight is 5.2%. This ingredient is employed to increase the low temperature capability of the ink.

1 to 8% by weight of General Analine and Flm Corporation's 2 butyne diol, 1.4% in which the preferred percent by weight is 1%. This ingredient is used as a stabilizer for the polyethylene oxide and to prevent its deterioration upon aging due primarily to oxidation.

78% by weight of distilled or deionized water.

The embodiments of the invention in which exclusive property or privilege is claimed are defined as follows:

1. A universal aqueous ink mixture consisting essentially of a distilled water solution of a 1 to 2 weight percent dye to produce a desired color intensity, 8 weight percent of glycerin, 8 weight percent of ethylene glycol, from 2½ to 8 weight percent potassium iodide, from 1 to 8 weight percent 2-butyne-1,4-diol and a polyethylene oxide polymer selected from the groups having a molecular weight of 600,000 or 4,000,000 in a quantity to produce an overall viscosity having a maximum value of 45 seconds oswald tube.

2. The ink mixture defined in claim 1 wherein .03% to .10% by weight of the solution is comprised of said polyethylene oxide.

3. The ink mixture defined in claim 1 wherein .04% by weight of the solution is comprised of said polyethylene oxide.

4. The ink defined in claim 1 wherein substantially .5 to 3% by weight of the mixture is comprised of the dye.

5. The ink mixture defined in claim 1 wherein the percent of dye is an alphazurine F.G.N.D. concentrate 200% blue.

6. The ink mixture defined in claim 1 wherein the dye is a wool Violet 4 BNP concentrate 120% purple.

7. The ink defined in claim 1 wherein substantially 5.2% by weight of the mixture is comprised of potassium iodide.

8. The ink defined in claim 1 wherein substantially 1% by weight of the mixture is comprised of said 2-butyne-1,4-diol.

9. The ink defined in claim 1 wherein sodium triphenolate is employed to form substantially .03 to .10% by weight of the mixture to deter fungi growth in the ink mixture.

10. The ink defined in claim 1 wherein sodium triphenolate is employed to form substantially .05% by weight of the mixture to deter fungi growth in the ink mixture.

11. The ink defined in claim 1 wherein substantially 78% by weight of distilled water, substantially 8% by water.

12. A universal ink mixture comprising substantially 78% by weight of distilled water substantially 8% by weight of glycerin, substantially 8% by weight of ethylene glycol, substantially 1–2% by weight of alphazurine F.G.N.D concentrate 200%, substantially 5.2% by weight of potassium iodide, substantially 1% by weight of 2-butyne-1,4-diol and .04% by weight of a polyethylene oxide polymer selected from the group having a molecular weight of 4,000,000 to produce an overall viscosity having a maximum value of 45 seconds oswald tube.

References Cited
UNITED STATES PATENTS 3,477,862  11/1969  Forsyth, Jr. _____ 106—22
3,486,912  12/1969  Dyson _____ 106—22

JOAN B. EVANS, Primary Examiner

U.S. Cl. X.R.

106—31